United States Patent
Ohkubo et al.

(10) Patent No.: US 6,959,199 B2
(45) Date of Patent: Oct. 25, 2005

(54) MULTICAST SIGNAL TRANSMISSION POWER CONTROL METHOD AND BASE STATION USING THE SAME

(75) Inventors: Shinzo Ohkubo, Yokosuka (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 613 days.

(21) Appl. No.: 09/825,952

(22) Filed: Apr. 5, 2001

(65) Prior Publication Data

US 2001/0046877 A1 Nov. 29, 2001

(30) Foreign Application Priority Data

| Apr. 6, 2000 | (JP) | ........................................ 2000-105231 |
| Apr. 6, 2000 | (JP) | ........................................ 2000-105232 |

(51) Int. Cl.[7] ............................................... H04B 7/00
(52) U.S. Cl. ......................... 455/522; 455/503; 455/69; 370/318; 370/390
(58) Field of Search ......................... 455/69, 503, 522; 370/318, 390, 252, 332, 333

(56) References Cited

U.S. PATENT DOCUMENTS

| 5,386,589 | A | | 1/1995 | Kanai |
| 5,794,157 | A | | 8/1998 | Haartsen |
| 5,881,368 | A | | 3/1999 | Grob et al. |
| 6,072,998 | A | * | 6/2000 | Kaku ........................ 455/234.2 |
| 6,253,077 | B1 | * | 6/2001 | Burt et al. ................... 455/424 |
| 6,289,217 | B1 | * | 9/2001 | Hamalainen et al. ....... 455/425 |
| 6,590,883 | B1 | * | 7/2003 | Kitade et al. ................ 370/337 |
| 6,650,906 | B1 | * | 11/2003 | Bousquet et al. ........... 455/522 |

FOREIGN PATENT DOCUMENTS

| CN | 1120293 | 4/1996 |
| CN | 1235718 | 3/1998 |
| EP | 0 986 276 | 3/2000 |
| JP | 6-326691 | 11/1994 |
| JP | 8-8817 | 1/1996 |
| JP | 2000-138632 | 5/2000 |
| KR | 1999-009542 | 2/1999 |

OTHER PUBLICATIONS

Lof C, G (Personal, Indoor and Mobile Radio Communications, 1998. The Ninth IEEE International Symposium on, vol.: 2, Sep. 8–11, 1998 pp.: 910–914 vol. 2.*

* cited by examiner

Primary Examiner—Nay Maung
Assistant Examiner—Raymond Dean
(74) Attorney, Agent, or Firm—Oblon, Spivak, McClelland, Maier & Neustadt, P.C.

(57) ABSTRACT

In a transmission power control method of the present invention, a value of a received signal quality parameter of a received multicast signal is measured. A parameter signal, indicating the received signal quality parameter value, is transmitted from a plurality of mobile stations to a base station through a radio link. The parameter signals from the mobile stations are received at the base station through the radio link. A power control value of each of the mobile stations is determined based on the received signal quality parameter values of the received parameter signals. The transmission power of the multicast signal, sent to each of the mobile stations, is controlled based on the determined power control value.

14 Claims, 8 Drawing Sheets

| MS | R/Q PARA |
|---|---|
| A | 0 dB |
| B | +8 dB |
| C | -5 dB |
| D | +10 dB |
| E | +3 dB |

FIG.3B

| MS | R/Q PARA |
|---|---|
| C | -5 dB |
| A | 0 dB |
| E | +3 dB |
| D | +10 dB |
| B | +8 dB |

FIG.3C

| MS | R/Q PARA |
|---|---|
| C | -5 dB |
| A | 0 dB |
| E | +3 dB |
| B | (+8 dB) |
| D | +10 dB |

MULTICAST SIGNAL TRANSMISSION POWER CONTROL METHOD AND BASE STATION USING THE SAME

BACKGROUND OF THE INVENTION

1. Field of the Invention

The present invention relates to a multicast signal transmission power control method that controls a transmission power of a multicast signal that is transmitted by a base station to a plurality of mobile stations through a radio link. Further, the present invention relates to a base station that uses the transmission power control method for the transmission of the multicast signal.

2. Description of the Related Art

Transmission of a multicast signal across a mobile radio link is known. In such multicast communications, a multicast signal is simultaneously transmitted from a base station to each of a plurality of specified mobile stations. Such multicast signals, sent by the base station, contain identical messages and different destinations, and the identical message is delivered to each of the mobile stations specified as the destination stations that receive it.

Figure 8:
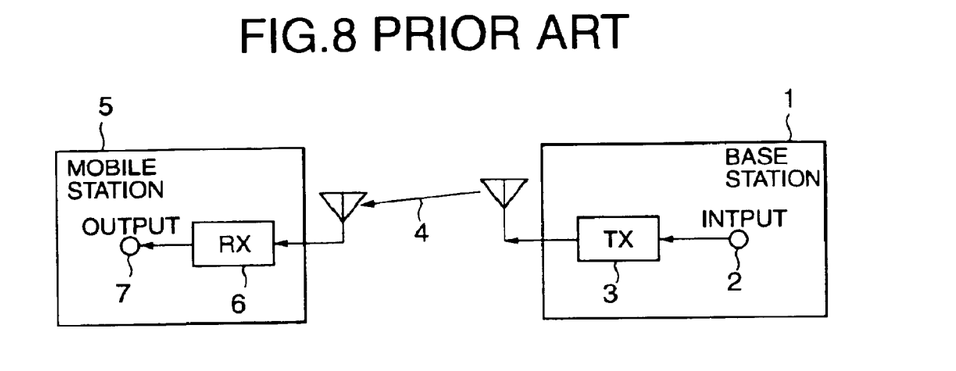
FIG. 8 is a block diagram of a conventional multicast signal communication system.

FIG. 8 shows a conventional multicast signal communication system. In the communication system shown in FIG. 8, a base station 1 is provided, and this base station 1 transmits a multicast signal 4. A plurality of mobile stations 5 are provided in the communication system, and each mobile station 5 receives the multicast signal 4 from the base station 1. For the sake of simplicity of description, only one mobile station 5 is shown in FIG. 8, and the remaining mobile stations 5, which receive the multicast signal 4, are omitted.

In the base station 1, the original message of the multicast signal 4 is supplied from an input terminal 2, and it is input to a transmitter (TX) 3. In the transmitter 3, the carrier wave is modulated in accordance with the original message from the input terminal 2, and the multicast signal 4 is produced. After the modulation is performed, the transmitter 3 transmits the multicast signal 4 to one of the mobile stations 5 based on a predetermined transmission power.

In the mobile station 5 (or one of the plurality of mobile stations 5), the multicast signal 4 from the base station 1 is received at a receiver (RX) 6. After the demodulation of the received multicast signal is performed, the receiver 6 supplies the demodulated multicast signal to an output terminal 7, and it is output from the output terminal 7 to internal units of the mobile station 5.

In the communication system of FIG. 8, the base station 1 is not provided with a mechanism that controls the transmission power of the base station 1 used to transmit the multicast signal 4 to the mobile station 5, such that the transmission power is suited to the received signal quality (or the grade of service) of the mobile station 5. It is difficult for the base station 1 to effectively reduce the transmission power of the base station to the optimum level for transmitting the multicast signal to the mobile stations so as to be in conformity with the received signal quality required for the mobile stations which receive the multicast signal.

In order to ensure that the received multicast signal conforms to the received signal quality of all the mobile stations located with the related cell of the base station 1, it is necessary that the predetermined transmission power, used by the base station 1 of the conventional communication system, be set to a level which is larger than the marginal transmission power needed to transmit the multicast signal from the base station 1 to the mobile stations. The base station 1 must always use the predetermined transmission power that is larger than the smallest possible transmission power, because the base station 1 includes no transmission power control mechanism.

However, when the mobile stations densely exist at locations near the base station 1, the predetermined transmission power of the base station 1 becomes excessively large. This will cause the interference of the transmission power of the base station 1 for the receiver mobile stations which receive the multicast signal with that for the non-receiver mobile stations which do not receive the multicast signal. It is difficult for the conventional multicast signal communication system to provide efficient use of the transmission power of the base station for the transmission of the multicast signal to the mobile stations.

SUMMARY OF THE INVENTION

It is an object of the present invention to provide an improved multicast signal transmission power control method in which the above-described problems are eliminated.

Another object of the present invention is to provide a multicast signal transmission power control method that can effectively reduce the transmission power of the base station to transmit the multicast signal to the mobile stations without changing the received signal quality of the mobile stations which receive the multicast signal and without causing the interference of the transmission power of the base station to the mobile stations which do not receive the multicast signal.

Another object of the present invention is to provide a base station that can effectively reduce the transmission power of the base station to transmit the multicast signal to the mobile stations without changing the received signal quality of the mobile stations which receive the multicast signal and without causing the interference of the transmission power of the base station to the mobile stations which do not receive the multicast signal.

The above-mentioned objects of the present invention are achieved by a method of controlling a transmission power of a multicast signal that is transmitted from a base station to a plurality of mobile stations through a radio link, the method comprising the steps of: measuring a value of a received signal quality parameter of a multicast signal received at the mobile stations; transmitting a parameter signal, indicating the received signal quality parameter value, from the mobile stations to the base station through the radio link; receiving the parameter signals from the mobile stations at the base station through the radio link; determining a power control value of each of the mobile stations based on the received signal quality parameter values of the parameter signals received at the base station; and controlling the transmission power of the multicast signal, sent to each of the mobile stations, based on the determined power control value.

The above-mentioned objects of the present invention are achieved by a base station which controls a transmission power of a multicast signal that is transmitted to a plurality of mobile stations through a radio link, the base station comprising: a receiver which receives parameter signals from the mobile stations through the radio link, each parameter signal indicating a value of a received signal quality parameter of the multicast signal received at one of the mobile station; a determination unit which determines a power control value of each of the mobile stations based on the received signal quality parameter values of the parameter signals received by the receiver; and a transmission power controller which controls the transmission power of the multicast signal, sent to each of the mobile stations, based on the determined power control value.

The above-mentioned objects of the present invention are achieved by a method of controlling a transmission power of a multicast signal that is transmitted from a base station to a plurality of mobile stations through a radio link, the method comprising the steps of: transmitting the multicast signal to the mobile stations through the radio link; receiving an automatic repeat request ARQ signal from each of the mobile stations at the base station through the radio link, wherein each of the mobile stations transmits the ARQ signal to the base station when an error in demodulation of a received multicast signal occurs; detecting whether at least one of a plurality of ARQ signals from the mobile stations is received at the base station; outputting a power control signal indicating a result of the ARQ-signal detection; and controlling the transmission power of the multicast signal, sent to each of the mobile stations, based on the ARQ-signal detection result indicated by the power control signal.

The above-mentioned objects of the present invention are achieved by a base station which controls a transmission power of a multicast signal that is transmitted to a plurality of mobile stations through a radio link, the base station comprising: a transmitter which transmits the multicast signal to the mobile stations through the radio link; a receiver which receives an automatic repeat request ARQ signal from each of the mobile stations through the radio link, wherein each of the mobile stations transmits the ARQ signal to the base station when an error in demodulation of a received multicast signal occurs; a signal counter unit which detects whether at least one of a plurality of ARQ signals from the mobile stations is received by the receiver, and outputs a power control signal indicating a result of the ARQ-signal detection; and a transmission power controller which controls the transmission power of the multicast signal, sent to each of the mobile stations, based on the ARQ-signal detection result indicated by the power control signal of the signal counter unit.

In the multicast signal transmission power control method and the base station of the present invention, the parameter signals from the mobile stations are received at the base station through the radio link, each parameter signal indicating a value of the received signal quality parameter of the received multicast signal. A power control value of each of the mobile stations is determined based on the received signal quality parameter values of the received parameter signals. The transmission power of the multicast signal, sent to each of the mobile stations, is controlled based on the determined power control value. The multicast signal transmission power control method of the present invention is effective in reducing the transmission power of the base station to transmit the multicast signal to the mobile stations without changing the received signal quality of the mobile stations which receive the multicast signal and without causing the interference of the transmission power of the base station to the mobile stations which do not receive the multicast signal.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 1:
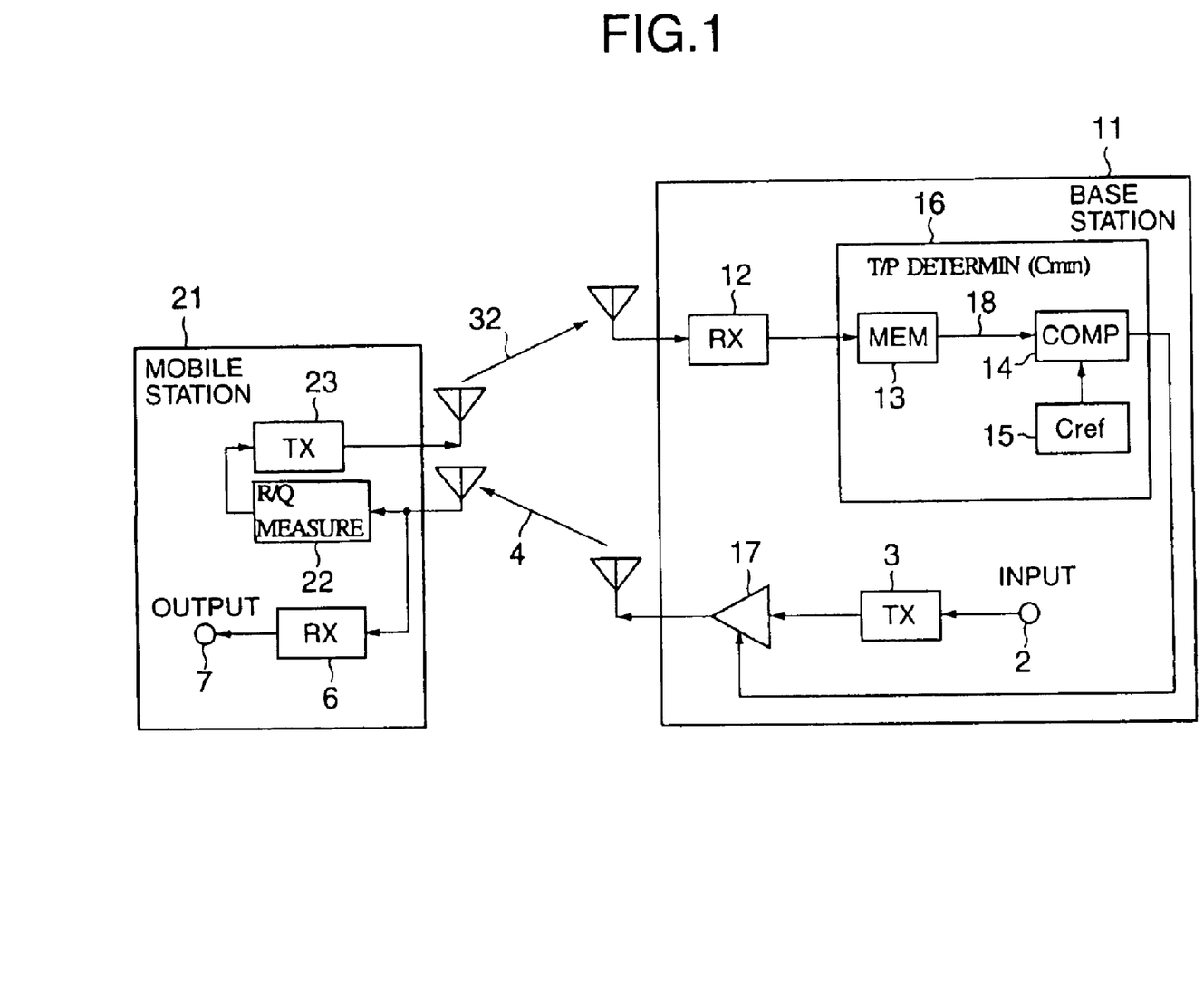
FIG. 1 is a block diagram of a first preferred embodiment of the multicast signal transmission system of the invention.

FIG. 1 shows a first preferred embodiment of a multicast signal transmission system in which the transmission power control method of the invention is embodied.

In FIG. 1, the elements that are essentially the same as corresponding elements in FIG. 8 are designated by the same reference numerals, and a description thereof will be omitted.

According to the transmission power control method of the invention, each of a plurality of mobile stations (MS) measures a value of a received signal quality (or the grade of service) parameter of a received multicast signal, which is received from a base station (BS) via a radio link. Suppose that a specific one of the grades of service is assigned, in advance, for each of the plurality of mobile stations.

In the present embodiment, a reception power of a received multicast signal is measured by each of the mobile stations as being the received signal quality parameter value that is the base to determine a power control value of each mobile station, and a transmission power of the multicast signal of the base station with respect to each mobile station is controlled based on the power control value.

As shown in FIG. 1, in the multicast signal transmission system of the present embodiment, a base station 11 is provided, and the base station 11 transmits a multicast signal 4 to a plurality of mobile stations 21 through a mobile radio link. The plurality of mobile stations 21 are provided in the multicast signal transmission system, and each mobile station 21 receives the multicast signal 4 from the base station 11.

For the sake of simplicity of description, only one mobile station 21 is shown in FIG 1, and the remaining mobile stations 21, which receive the multicast signal 4 from the base station 11, are omitted.

In the base station 11 shown in FIG. 1, a receiver (RX) 12, a transmission power determination unit (T/P DETERMIN) 16, the transmitter (TX) 3, and a transmission power controller 17 are provided. In the determination unit 16, a memory 13, a comparator 14, and a reference reception power value (Cref) 15 are provided. As described later, the transmission power controller 17 controls a transmission power of the multicast signal 4, sent to each of the mobile stations 21, based on a power control value indicated by an output signal of the determination unit 16.

In the base station 11, an original message of the multicast signal 4 is supplied from the input terminal 2, and it is input to the transmitter (TX) 3. In the transmitter 3, the carrier wave is modulated in accordance with the original message from the input terminal 2, so that the multicast signal 4 is produced. In the transmission power controller 17, the transmission power of the multicast signal 4, sent to each of the mobile stations 21, is controlled based on the power control value indicated by the output signal of the determination unit 16. After the modulation is performed, the transmitter 3 transmits the multicast signal 4 to each of the mobile stations 21 through the network, based on the controlled transmission power of the transmission power controller 17.

In the mobile station 21, the receiver (RX) 6, a received signal quality measurement unit (R/Q MEASURE) 22 and a transmitter (TX) 23 are provided. In the present embodiment, the measurement unit 22 is a power measuring circuit that measures a reception power of the multicast signal 4 received at the mobile station 21. The measurement unit 22 supplies a detection signal, indicating the reception power of the multicast signal 4 as the received signal quality parameter value to the transmitter 23. In the transmitter 23, the carrier wave is modulated in accordance with the reception power, and the transmitter 23 transmits a parameter signal, indicating the reception power as the received signal quality parameter value, to the base station 11 through an uplink 32 of the radio link.

Similar to the communication system of FIG. 8, in the mobile station 21 shown in FIG. 1, the multicast signal 4 from the base station 11 is received at the receiver (RX) 6. After the demodulation of the received multicast signal is performed, the receiver 6 supplies the demodulated multicast signal to the output terminal 7, and it is supplied from the output terminal 7 to internal units of the mobile station 21.

In the multicast signal transmission system of FIG. 1, the measurement unit 22 measures a reception power of the multicast signal 4 received at the mobile station 21. More specifically, the measurement unit 22 measures the reception power of the received multicast signal 4 at a suitable timing that is suited to the signal structure of the multicast signal 4. For example, if the multicast signal 4 is provided in the form of slots, the detection of the reception power is performed by the measurement unit 22 at the suitable timing on a slot basis. If the multicast signal 4 is provided in the form of blocks, the detection of the reception power is performed by the measurement unit 22 at the suitable timing on a block basis. If the multicast signal 4 is provided in the form of frames, the detection of the reception power is performed by the measurement unit 22 at the suitable timing on a frame basis.

The measurement unit 22 supplies the detection signal, indicating the reception power of the multicast signal 4 as the received signal quality parameter value, to the transmitter 23. In the transmitter 23, the carrier wave is modulated in accordance with the reception power, and the transmitter 23 transmits the parameter signal, indicating the reception power as the received signal quality parameter value, to the base station 11 through the uplink 32 of the radio link. The uplink 32 may be a channel of the radio link used for random access.

In the base station 11 of the multicast signal transmission system of FIG. 1, the receiver 12 receives the parameter signals from the plurality of mobile stations 21 through the uplink 32 of the radio link. After the demodulation of the received parameter signals is performed, the receiver 12 supplies the parameter signals related to the mobile stations 21 to the received signal quality determination unit 16, and they are temporarily stored into the memory 13. As described above, each of the parameter signals, received from the mobile stations 21 and stored into the memory 13, indicates the reception power as the received signal quality parameter value.

In the base station 11 of the present embodiment, the determination unit 16 determines a minimum value (Cmin) of the received signal quality parameter values (or the multicast-signal reception powers of the mobile stations 21) of the parameter signals, stored in the memory 13, as the power control value. The minimum value (Cmin) of the multicast-signal reception powers of the mobile stations 21 is supplied to one of two inputs of the comparator 14. The reference reception power value (Cref) 15 is always supplied to the other input of the comparator 14. In the comparator 14, the minimum value (Cmin) is compared with the reference reception power value (Cref). The comparator 14 supplies a signal, indicating the difference (Cref−Cmin) between the reference reception power value (Cref) and the minimum value (Cmin), from the output of the comparator 14 to the transmission power controller 17 as the power control value.

In the base station 11 of the present embodiment, the transmission power controller 17 controls the transmission power of the multicast signal 4 based on the power control value (or the reception power difference (Cref−Cmin)) indicated by the output signal of the comparator 14. The above-described control procedure is repeatedly performed by the multicast signal transmission system of the present embodiment during the transmission of the multicast signal 4.

For example, in the base station 11 of the present embodiment, when Cmin=5 dBm and Cref=0 dBm, the reception power difference (Cref−Cmin) is equal to −5 dBm, and the current transmission power of the multicast signal 4 is decreased by the controller 17 by 5 dBm. When Cmin=−5 dBm and Cref=0 dBm, the reception power difference (Cref−Cmin) is equal to 5 dBm, and the current transmission power of the multicast signal 4 is increased by the controller 17 by 5 dBm.

As described above, in the base station 11 of the present embodiment, the transmitter 3 transmits the multicast signal 4 to each of the mobile stations 21 through the network, based on the transmission power that is properly controlled by the transmission power controller 17. Therefore, the multicast signal transmission power control method of the present embodiment is effective in reducing the transmission power of the base station 11 to transmit the multicast signal to the mobile stations 21 without changing the grades of service of the mobile stations 21 which receive the multicast signal and without causing the interference of the transmission power of the base station 11 to the mobile stations 21 which do not receive the multicast signal. In the present embodiment, the transmission power of the multicast signal 4 is controlled by the transmission power controller 17 such that it is suited to the minimum value of the received signal quality parameter values received from the respective mobile stations 21.

Figure 2:
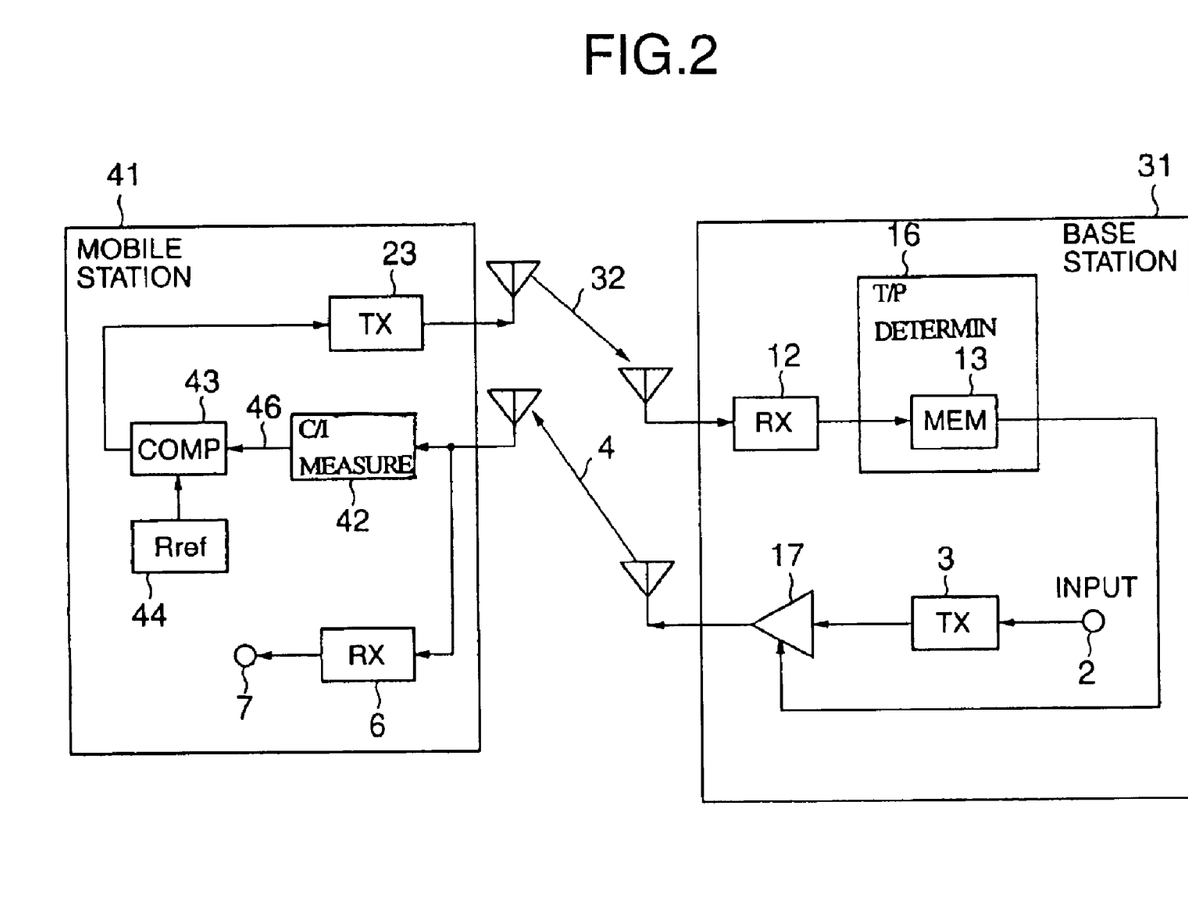
FIG. 2 is a block diagram of a second preferred embodiment of the multicast signal transmission system of the invention.

FIG. 2 shows a second preferred embodiment of the multicast signal transmission system in which the transmission power control method of the invention is embodied.

In FIG. 2, the elements that are essentially the same as corresponding elements in FIG. 1 are designated by the same reference numerals, and a description thereof will be omitted.

As described above, according to the transmission power control method of the invention, each of the plurality of mobile stations measures a value of the received signal quality parameter of the multicast signal, which is received from the base station.

In the present embodiment, each of the mobile stations measures a difference between a measured carrier-to-cochannel interference (C/I) ratio (R) and a reference C/I ratio (Rref) of the received multicast signal as being the received signal quality parameter value that is the base to determine a power control value of each mobile station, and the transmission power of the multicast signal of the base station with respect to each mobile station is controlled based on the power control value.

As shown in FIG. 2, in the multicast signal transmission system of the present embodiment, a base station 31 is provided, and the base station 31 transmits the multicast signal 4 to a plurality of mobile stations 41 through a mobile radio link. The plurality of mobile stations 41 are provided in the multicast signal transmission system, and each mobile station 41 receives the multicast signal 4 from the base station 31.

For the sake of simplicity of description, only one mobile station 41 is shown in FIG. 2, and the remaining mobile stations 41, which receive the multicast signal 4 from the base station 31, are omitted.

In the base station 31 shown in FIG. 2, the receiver (RX) 12, the received signal quality determination unit (TIP DETERMIN) 16, the transmitter (TX) 3, and the transmission power controller 17 are provided. In the determination unit 16, the memory 13 is provided. As described later, the transmission power controller 17 controls the transmission power of the multicast signal 4, sent to each of the mobile stations 41, based on the power control value indicated by an output signal of the determination unit 16.

In the mobile station 41 of the present embodiment, the receiver (RX) 6, a carrier-to-cochannel interference (C/I) ratio measurement unit (C/I DETECT) 42, a comparator (COMP) 43, a reference C/I ratio value (Rref) 44, and the transmitter (TX) 23 are provided. In the present embodiment, the measurement unit 42 is a C/I ratio detector circuit that measures a C/I ratio (R) of the multicast signal 4 received at the mobile station 41. The measurement unit 42 supplies a detection signal 46, indicating the C/I ratio of the multicast signal 4, to the comparator 43 as the received signal quality parameter value. In the comparator 43, the C/I ratio (R) is compared with the reference C/I ratio value (Rref) 44. The comparator 43 outputs a signal, indicating a difference between the reference C/I ratio (Rref) 44 and the measured C/I ratio (R), to the transmitter 23.

In the transmitter 23, the carrier wave is modulated in accordance with the C/I ratio difference, and the transmitter 23 transmits a parameter signal, indicating the C/I ratio difference (Rref−R) as the received signal quality parameter value, to the base station 31 through the uplink 32 of the radio link.

Similar to the communication system of FIG. 8, in the mobile station 41 shown in FIG. 2, the multicast signal 4 from the base station 31 is received at the receiver (RX) 6. After the demodulation of the received multicast signal is performed, the receiver 6 supplies the demodulated multicast signal to the output terminal 7, and it is supplied from the output terminal 7 to internal units of the mobile station 41.

In the multicast signal transmission system of FIG. 2, the measurement unit 42 measures a C/I ratio of the multicast signal 4 received at the mobile station 41. More specifically, the measurement unit 42 measures the C/I ratio of the received multicast signal 4 at a suitable timing that is suited to the structure of the multicast signal 4. The timing of the detection of the C/I ratio is the same as that in the previous embodiment of FIG. 1.

The measurement unit 42 supplies the signal 46, indicating the C/I ratio of the multicast signal 4 as the received signal quality parameter value, to one of two inputs of the comparator 43. The reference C/I ratio (Rref) 44 is always supplied to the other input of the comparator 43. The comparator 43 supplies the signal, indicating the C/I ratio difference (Rref−R), to the transmitter 23.

In the transmitter 23, the carrier wave is modulated in accordance with the C/I ratio difference (Rref−R). After the modulation is performed, the transmitter 23 transmits the parameter signal, indicating the C/I ratio difference as the received signal quality parameter value, to the base station 31 through the uplink 32 of the radio link. The uplink 32 may be a channel of the radio link used for random access.

In the base station 31 of the multicast signal transmission system of FIG. 2, the receiver 12 receives the parameter signals from the plurality of mobile stations 41 through the uplink 32 of the radio link. After the demodulation of the received parameter signals is performed, the receiver 12 supplies the parameter signals related to the mobile stations 41 to the received signal quality determination unit 16, and they are temporarily stored into the memory 13. As described above, each of the parameter signals, received from the mobile stations 41 and stored into the memory 13, indicates the C/I ratio difference as the received signal quality parameter value.

In the base station 31 of the present embodiment, the determination unit 16 rearranges the received signal quality parameter values (the C/I ratio differences), which are stored in the memory 13, into a sequence of the parameter values in a predetermined order. The determination unit 16 determines one of the parameter values in the rearranged sequence that corresponds to a predetermined ratio of the entire mobile stations 41, as the power control value.

Figure 3A:
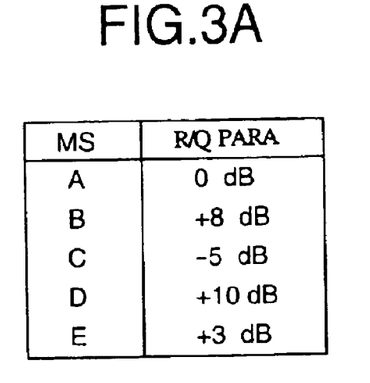
FIG. 3A, FIG. 3B and FIG. 3C are diagrams for explaining operations of the multicast signal transmission system of the second preferred embodiment.
Figure 3B:
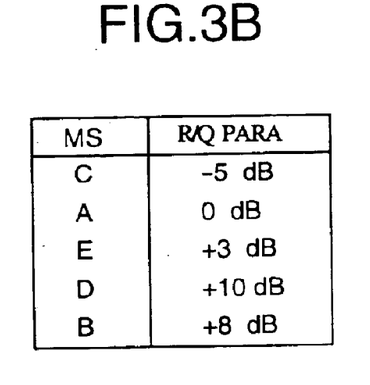
Figure 3C:
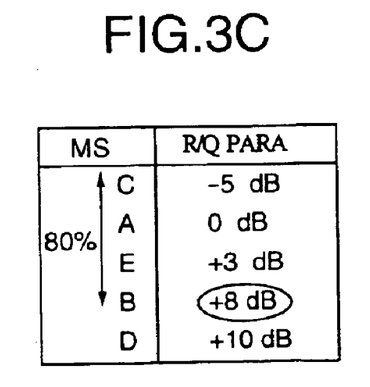

FIG. 3A, FIG. 3B and FIG. 3C show operations of the determination unit 16 in the multicast signal transmission system of the present embodiment.

In the present embodiment, the received signal quality parameter values (T/P PARA) of the mobile stations ("A" through "E") are stored into the memory 13 in the order of reception of each parameter signal as shown in FIG. 3A. The received signal quality parameter values (or the C/I ratio differences of the mobile stations) are rearranged into a sequence of the parameter values in a predetermined order (e.g., in a descending order of each C/I ratio difference) as shown in FIG. 3B. As shown in FIG. 3C, one of the parameter values in the rearranged sequence that corresponds to a predetermined ratio (e.g., 80%) of the entire mobile stations "A" through "E" is determined by the determination unit 16 of the base station 31 as the power control value.

The parameter value, which is determined from among the parameter values of the mobile stations 41 as the power control value, is supplied from the determination unit 16 to the transmission power controller 17 as the power control value. In the example of FIG. 3C, the parameter value that corresponding to the mobile station "B" (80% of the five mobile stations) is +8 dB, and the determination unit 16 outputs the signal, indicating +8 dB as the power control value, to the transmission power controller 17.

In the base station 31 of the present embodiment, the transmission power controller 17 controls the transmission power of the multicast signal 4 based on the power control value (or the determined parameter value) indicated by the output signal of the determination unit 16. The above-described control procedure is repeatedly performed by the multicast signal transmission system of the present embodiment during the transmission of the multicast signal 4.

For example, in the base station 31 of the present embodiment, when the power control value is equal to +8 dB, the current transmission power of the multicast signal 4 is changed to +8 dB by the transmission power controller 17.

As described above, in the base station 31 of the present embodiment, the transmitter 3 transmits the multicast signal 4 to each of the mobile stations 41 through the network, based on the transmission power that is properly controlled by the transmission power controller 17. Therefore, the multicast signal transmission power control method of the present embodiment is effective in reducing the transmission power of the base station 31 to transmit the multicast signal to the mobile stations 41 without changing the grades of service of the mobile stations 41 which receive the multicast signal and without causing the interference of the transmission power of the base station 31 to the mobile stations 41 which do not receive the multicast signal. In the present embodiment, the transmission power of the multicast signal 4 is controlled by the transmission power controller 17 such that it is suited to one of the parameter values in the rearranged sequence that corresponds to a predetermined ratio of the entire mobile stations 41.

Figure 4:
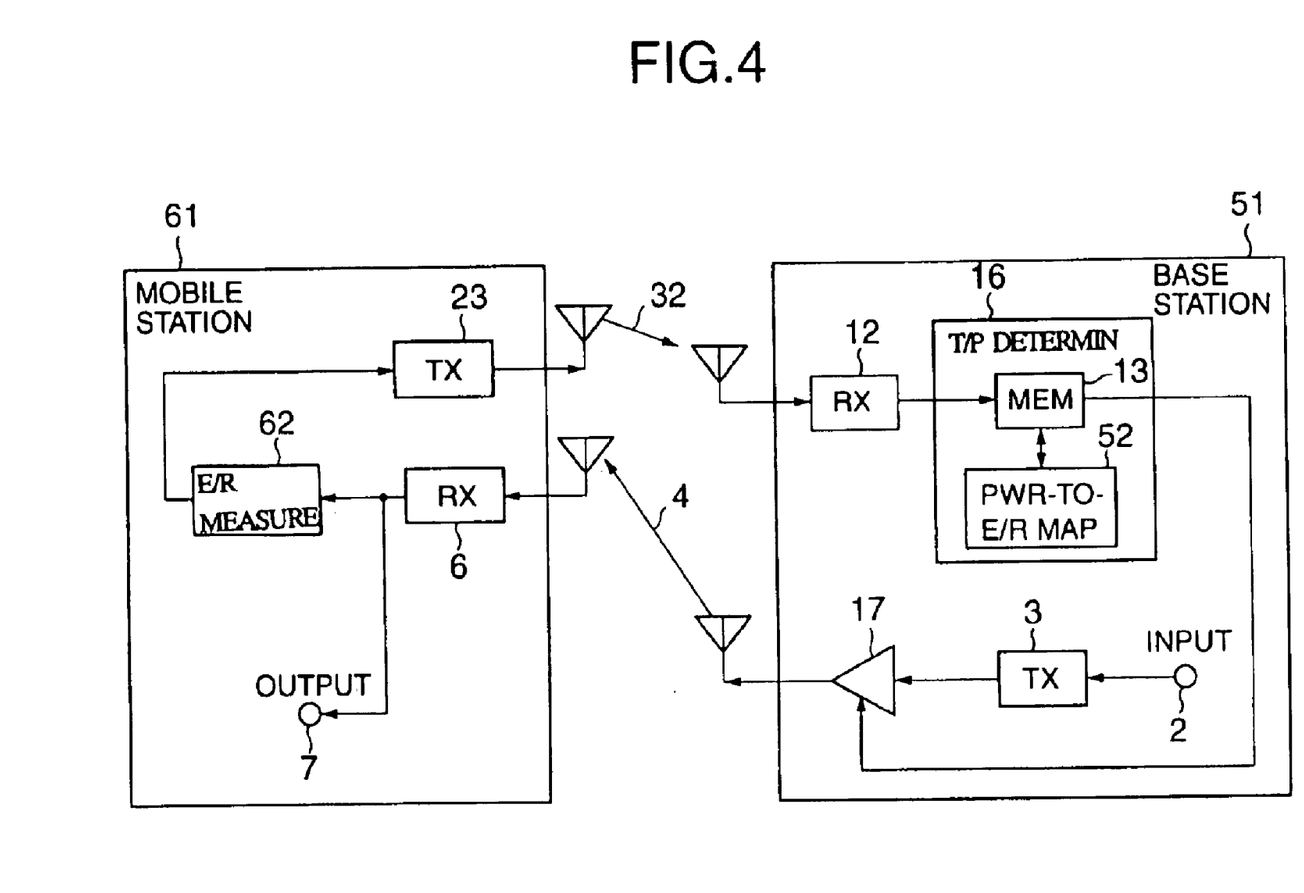
FIG. 4 is a block diagram of a third preferred embodiment of the multicast signal transmission system of the invention.

FIG. 4 shows a third preferred embodiment of the multicast signal transmission system in which the transmission power control method of the invention is embodied.

In FIG. 4, the elements that are essentially the same as corresponding elements in FIG. 1 are designated by the same reference numerals, and a description thereof will be omitted.

In the present embodiment, each of the mobile stations measures an error ratio (E/R) of the received multicast signal to a given bit pattern as being the received signal quality parameter value that is the base to determine a power control value of each mobile station, and the transmission power of the multicast signal of the base station with respect to each mobile station is controlled based on the power control value.

As shown in FIG. 4, in the multicast signal transmission system of the present embodiment, a base station 51 is provided, and the base station 51 transmits the multicast signal 4 to a plurality of mobile stations 61 through the mobile radio link. The plurality of mobile stations 61 are provided in the multicast signal transmission system, and each mobile station 61 receives the multicast signal 4 from the base station 51.

For the sake of simplicity of description, only one mobile station 61 is shown in FIG. 4, and the remaining mobile stations 61, which receive the multicast signal 4 from the base station 51, are omitted.

In the base station 51 shown in FIG. 4, the receiver (RX) 12, the received signal quality determination unit (T/P DETERMIN) 16, the transmitter (TX) 3, and the transmission power controller 17 are provided. In the determination unit 16, the memory 13 and a power-to-error ratio map (PWR-TO-EIR MAP) 52 are provided. The power-to-error ratio map 52 provides a relationship between the transmission power and the error ratio for the determination unit 16. As described later, the determination unit 16 determines a power control value of each mobile station based on the output of the map 52 in response to the parameter signal received from the mobile station. The transmission power controller 17 controls the transmission power of the multicast signal 4, sent to each of the mobile stations 61, based on the power control value indicated by the output signal of the determination unit 16.

In the base station 51, the original message of the multicast signal 4 is supplied from the input terminal 2, and it is input to the transmitter (TX) 3. In the transmitter 3, the carrier wave is modulated in accordance with the original message from the input terminal 2, so that the multicast signal 4 is produced. In the transmission power controller 17, the transmission power of the multicast signal 4, sent to each of the mobile stations 61, is controlled based on the power control value indicated by the output signal of the determination unit 16. After the modulation is performed, the transmitter 3 transmits the multicast signal 4 to each of the mobile stations 61 through the network, based on the controlled transmission power of the transmission power controller 17.

In the mobile station 61, the receiver (RX) 6, an error ratio measurement unit (E/R DETECT) 62 and the transmitter (TX) 23 are provided. In the present embodiment, the measurement unit 62 is an error ratio detector circuit that measures an error ratio of the received multicast signal 4 to the given bit pattern. The measurement unit 62 supplies a detection signal, indicating the error ratio of the multicast signal 4 as the received signal quality parameter value, to the transmitter 23. In the transmitter 23, the carrier wave is modulated in accordance with the error ratio, and the transmitter 23 transmits a parameter signal, indicating the error ratio as the received signal quality parameter value of the mobile station 61, to the base station 51 through the uplink 32 of the radio link.

Similar to the communication system of FIG. 8, in the mobile station 61 shown in FIG. 4, the multicast signal 4 from the base station 51 is received at the receiver (RX) 6. After the demodulation of the received multicast signal is performed, the receiver 6 supplies the demodulated multicast signal to the output terminal 7, and it is supplied from the output terminal 7 to internal units of the mobile station 61.

In the base station 51 of the multicast signal transmission system of FIG. 4, the receiver 12 receives the parameter signals from the plurality of mobile stations 61 through the uplink 32 of the radio link. After the demodulation of the received parameter signals is performed, the receiver 12 supplies the parameter signals related to the mobile stations 61 to the received signal quality determination unit 16, and they are temporarily stored into the memory 13. As described above, each of the parameter signals, which are demodulated by the receiver 12 and stored into the memory 13, indicates the error ratio as the received signal quality parameter value of the related mobile station 61.

In the base station 51 of the present embodiment, the determination unit 16 selects a maximum value of the received signal quality parameter values (or the multicast-signal error ratios of the mobile stations 61) of the parameter signals, stored in the memory 13. The maximum value of the multicast-signal error ratios of the mobile stations 61 is supplied to the power-to-error ratio map 52. In response, the determination unit 16 receives a power value of the map 52 corresponding to the selected maximum error ratio, and determines the corresponding power value as being the power control value. The determination unit 16 outputs a signal, indicating the corresponding power value, to the transmission power controller 17 as the power control value.

In the base station 51 of the present embodiment, the transmission power controller 17 controls the transmission power of the multicast signal 4 based on the power control value (or the corresponding power value of the map 52 for the selected maximum error ratio) indicated by the output signal of the determination unit 16. The above-described control procedure is repeatedly performed by the multicast signal transmission system of the present embodiment during the transmission of the multicast signal 4.

As described above, in the base station 51 of the present embodiment, the transmitter 3 transmits the multicast signal 4 to each of the mobile stations 61 through the network, based on the transmission power that is properly controlled by the transmission power controller 17. Therefore, the multicast signal transmission power control method of the present embodiment is effective in reducing the transmission power of the base station 51 to transmit the multicast signal to the mobile stations 61 without changing the grades of service of the mobile stations 61 which receive the multicast signal and without causing the interference of the transmission power of the base station 51 to the mobile stations 61 which do not receive the multicast signal. In the present embodiment, the transmission power of the multicast signal 4 is controlled by the transmission power controller 17 such that it is suited to the maximum error ratio among the multicast-signal error ratios of the mobile stations 61.

In the multicast signal transmission system of the above-described embodiment, each of the mobile stations measures an error ratio of the received multicast signal to a given bit pattern as being the received signal quality parameter value that is the base to determine a power control value of each mobile station. The transmission power control method of the invention is not limited to this embodiment. Alternatively, the multicast signal transmission system of the present invention may be configured such that each of the mobile stations measures one of a bit error ratio, a packet error ratio and a slot error ratio of the received multicast signal as being the value of the received signal quality parameter. Alternatively, the multicast signal transmission system of the present invention may be configured such that each of the mobile stations measures one of an error-correction-bit number and a maximum likelihood value, obtained by decoding of the received multicast signal, as being the value of the received signal quality parameter.

Figure 5:
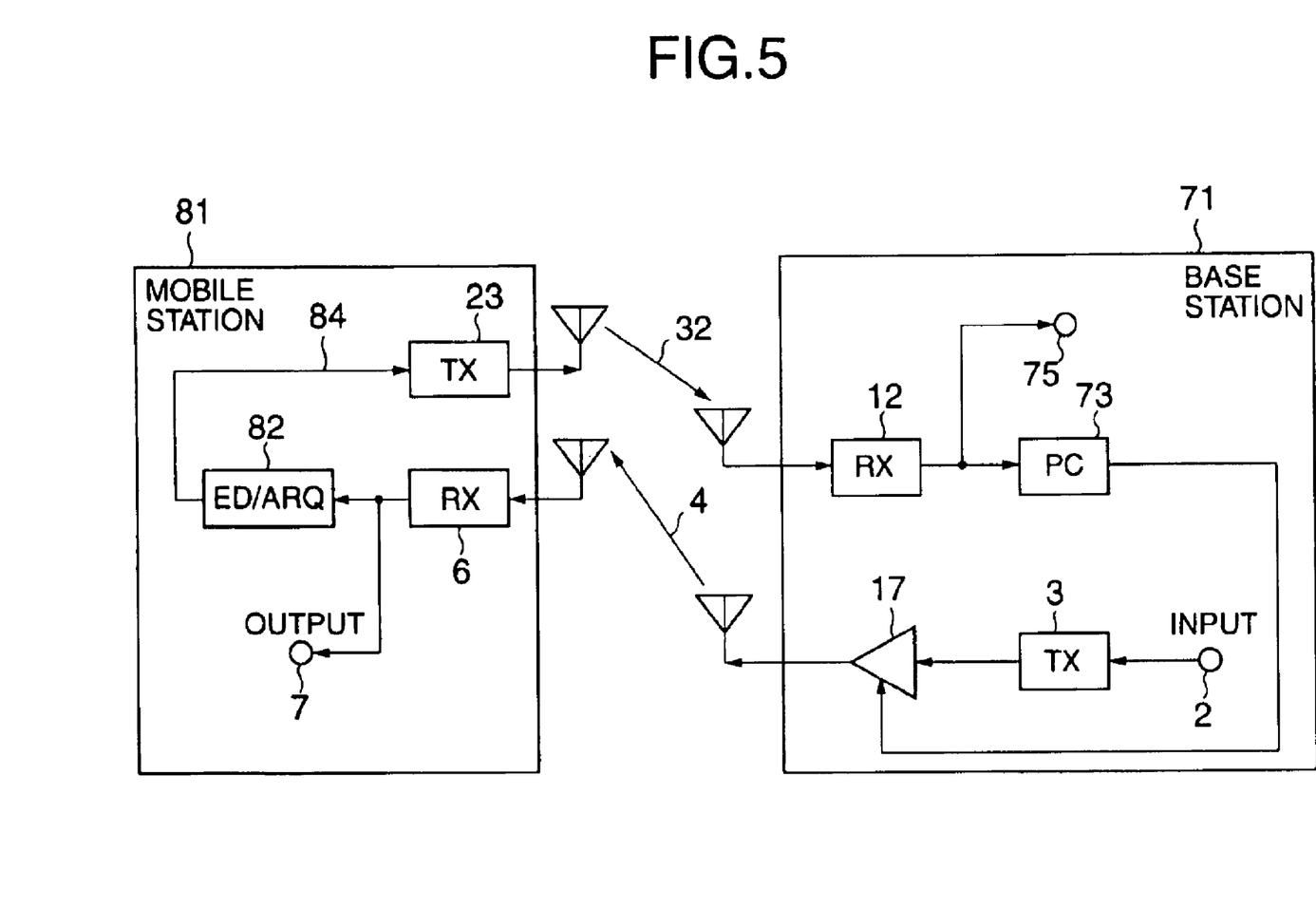
FIG. 5 is a block diagram of a fourth preferred embodiment of the multicast signal transmission system of the invention.

FIG. 5 shows a fourth preferred embodiment of the multicast signal transmission system in which the transmission power control method of the invention is embodied.

In FIG. 5, the elements that are essentially the same as corresponding elements in FIG. 1 are designated by the same reference numerals, and a description thereof will be omitted.

Suppose that, in the present embodiment, the multicast signal, which is transmitted from the base station (BS) to the plurality of mobile stations (MS) through the radio link, is provided in the form of blocks, and the transmission of the multicast signal is performed on a block basis. Suppose that cyclic redundancy check (CRC) codes for error detection of a received multicast signal are added to each of the multicast signal blocks.

In the present embodiment, when an error in demodulation of a received multicast signal is detected, each of the mobile stations transmits an automatic repeat request (ARQ) signal to the base station, and a transmission power of the multicast signal of the base station with respect to each mobile station is controlled based on the ARQ signal received from the mobile station.

As shown in FIG. 5, in the multicast signal transmission system of the present embodiment, a base station 71 is provided, and the base station 71 transmits the multicast signal 4 to a plurality of mobile stations 81 through the mobile radio link. The plurality of mobile stations 81 are provided in the multicast signal transmission system, and each mobile station 81 receives the multicast signal 4 from the base station 71.

For the sake of simplicity of description, only one mobile station 81 is shown in FIG. 5, and the remaining mobile stations 81, which receive the multicast signal 4 from the base station 71, are omitted.

In the base station 71 shown in FIG. 5, the receiver (RX) 12, an ARQ signal counter unit (PC) 73, the transmitter (TX) 3, and the transmission power controller 17 are provided. The signal counter unit 73 counts the number of ARQ signals received from the receiver 12. As described later, the transmission power controller 17 controls a transmission power of the multicast signal 4, sent to each of the mobile stations 81, based on a result of the ARQ-signal detection indicated by an output signal of the signal counter unit 73.

In the base station 71, the original message of the multicast signal 4 is supplied from the input terminal 2, and it is input to the transmitter (TX) 3. In the transmitter 3, the carrier wave is modulated in accordance with the original message from the input terminal 2, so that the multicast signal 4 is produced. In the transmission power controller 17, the transmission power of the multicast signal 4, sent to each of the mobile stations 81, is controlled based on the power control value indicated by the output signal of the signal counter unit 73. After the modulation is performed, the transmitter 3 transmits the multicast signal 4 to each of the mobile stations 81 through the network, based on the controlled transmission power of the transmission power controller 17.

In the mobile station 81, the receiver (RX) 6, an error detection/automatic repeat request (ED/ARQ) unit 82 and the transmitter (TX) 23 are provided. In the present embodiment, the ED/ARQ unit 82 detects whether an error in demodulation of the received multicast signal 4 takes place. The detection of such error in the demodulation of the received multicast signal 4 is performed by the ED/ARQ unit 82 on a block basis with respect to the received multicast signal 4. When an error in the demodulation of a certain block of the received multicast signal is detected, the ED/ARQ unit 82 supplies an ARQ signal 84, indicating the occurrence of the error, to the transmitter 23. After the modulation of the ARQ signal 84 is performed, the transmitter 23 transmits the ARQ signal 84 (e.g., a negative-acknowledge (NAK) signal), indicating a request for retransmission of the multicast signal to the mobile station 81, to the base station 71 through the uplink 32 of the radio link.

On the other hand, when no error in the demodulation of one block of the received multicast signal takes place, the transmitter 23 transmits an acknowledge (ACK) signal to the base station 71 through the uplink 32, which causes the mobile station 81 to be set in a waiting condition for receiving a following block of the multicast signal 4.

Similar to the communication system of FIG. 8, in the mobile station 81 shown in FIG. 5, the multicast signal 4 from the base station 71 is received at the receiver (RX) 6.

After the demodulation of the received multicast signal is performed, the receiver 6 supplies the demodulated multicast signal to the output terminal 7, and it is supplied from the output terminal 7 to internal units of the mobile station 81.

In the base station 71 of the multicast signal transmission system of FIG. 5, the receiver 12 receives the ARQ signals from the plurality of mobile stations 81 through the uplink 32 of the radio link. After the demodulation of the received parameter signals is performed, the receiver 12 supplies the ARQ signals of the mobile stations 81 to the signal counter unit 73. At the same time, the ARQ signals of the mobile stations 81 are supplied from an output terminal 75 into internal units of the base station 71. When the ARQ signal of one of the mobile stations 81 is received, the base station 71 transmits again the error-detected block of the multicast signal to the mobile station 81 (this is not shown in FIG. 5).

In the base station 71 of the present embodiment, the signal counter unit 73 temporarily stores the ARQ signals sent by the receiver 12, and counts the number of the stored ARQ signals at intervals of a predetermined time. Suppose that, in the present embodiment, the predetermined time for counting the number of the stored ARQ signals is twice the round-trip delay of the multicast signal blocks.

In the base station 71 of the multicast signal transmission system of FIG. 5, when the number of the stored ARQ signals, counted by the signal counter unit 73, is larger than zero, the signal counter unit 73 supplies a first power control signal to the transmission power controller 17 so as to increase the current transmission power of the multicast signal 4. On the other hand, when the number of the stored ARQ signals, counted by the signal counter unit 73, is equal to zero, the signal counter unit 73 supplies a second power control signal to the transmission power controller 17 so as to decrease the current transmission power of the multicast signal 4.

In the present embodiment, the amount of the transmission power that is changed (increased or decreased) from the current transmission power to a new transmission power is predetermined.

In the base station 71 of the present embodiment, the transmission power controller 17 controls the transmission power of the multicast signal 4 based on the power control signal sent by the signal counter unit 73. The above-described control procedure is repeatedly performed by the multicast signal transmission system of the present embodiment during the transmission of the multicast signal 4.

Figure 6:
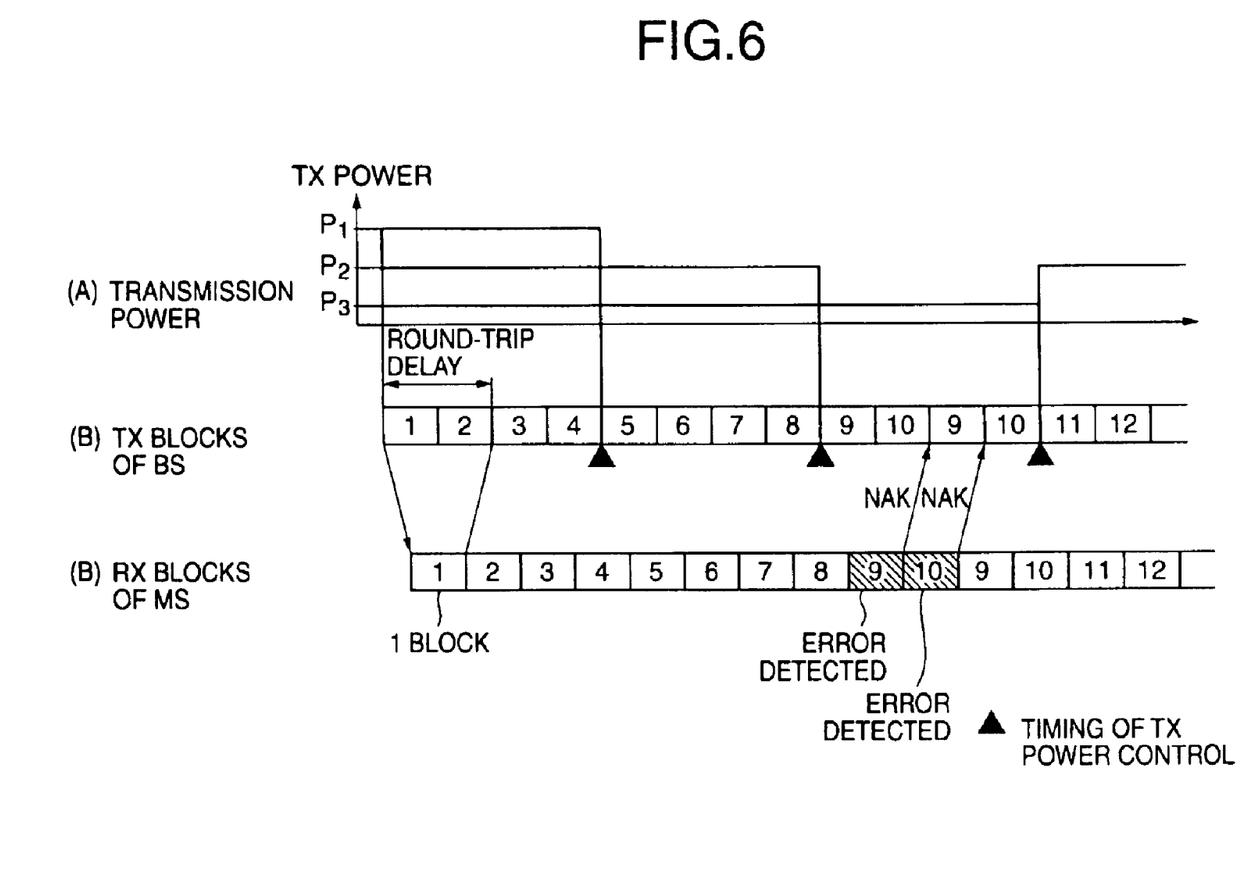
FIG. 6 is a timing chart for explaining operations of the multicast signal transmission system of the fourth preferred embodiment.

FIG. 6 is a timing chart for explaining operations of the multicast signal transmission system of the fourth preferred embodiment.

In FIG. 6, (A) indicates changes of the transmission power of the multicast signal at the base station (BS) with respect to the elapsed time, (B) indicates a sequence of the multicast signal blocks transmitted by the base station (BS) with respect to the elapsed time, and (C) indicates a sequence of the multicast signal blocks received by the mobile station (MS) with respect to the elapsed time. For the sake of simplicity of description, only one mobile station 81, as shown in FIG. 5, is considered.

As indicated by (B) in FIG. 6, the sequence of the multicast signal blocks is transmitted by the base station 71 to the mobile station 81. Suppose that the cyclic redundancy check (CRC) codes for error detection of a received multicast signal are added to each of the multicast signal blocks. Suppose that the round-trip delay is equal to a transmission time of two multicast signal blocks. In other words, it is supposed that the timing the base station 71 receives an ARQ signal related to the multicast signal block "1" from the mobile station 81 precedes the start of the transmission of the multicast signal block "3". Further, suppose that the timing the base station 71 controls the transmission power of the multicast signal is twice the round-trip delay of the multicast signal blocks, namely, it is equal to a transmission time of four multicast signal blocks.

As shown in FIG. 6, no ARQ signal related to the blocks "1" and "2" is detected by the base station 71 prior to the start of the transmission of the blocks "3" and "4", and the first transmission power "P1" is decreased to the second transmission power "P2" at the start of the transmission of the block "5". The transmission power of the blocks "1" to "4" is maintained at "P1".

After the start of the transmission of the block "5", no ARQ signal related to the blocks "5" and "6" is detected by the base station 71 prior to the start of the transmission of the blocks "7" and "8", and the second transmission power "P2" is decreased to the third transmission power "P3" at the start of the transmission of the block "9". The transmission power of the multicast signal blocks "5" to "8" is maintained at "P2".

After the start of the transmission of the block "9", the ARQ signals related to the blocks "9" and "10" are detected by the base station 71 prior to the start of the transmission of the blocks "11" and "12", and the third transmission power "P3" is increased to the second transmission power "P2" at the start of the transmission of the block "11". The transmission power control procedures that are the same as those described above are continuously performed.

As described above, in the base station 71 of the present embodiment, the transmitter 3 transmits the multicast signal 4 to each of the mobile stations 81 through the network, based on the transmission power that is properly controlled by the transmission power controller 17. Therefore, the multicast signal transmission power control method of the present embodiment is effective in reducing the transmission power of the base station 71 to transmit the multicast signal to the mobile stations 81 without changing the grades of service of the mobile stations 81 which receive the multicast signal and without causing the interference of the transmission power of the base station 11 to the mobile stations 81 which do not receive the multicast signal.

In the above-described embodiment of FIG. 6, the base station controls the transmission power of the multicast signal based on whether the ARQ signal (NAK) from the mobile station is received at the base station or not. In the present embodiment, the signal counter unit 73, which counts the number of ARQ signals received from the mobile stations at the receiver 12, is not necessarily needed in the base station 71. Hence, in the present embodiment, the signal counter unit 73 in the base station 71 may be omitted if a measurement unit, which detects whether the ARQ signal (NAK) from the mobile station is received at the base station, is provided in the base station 71.

Alternatively, in the multicast signal transmission system of the present invention, another signal counter unit, which detects whether a ratio of the number of the received ARQ signals to the total number of the mobile stations exceeds a predetermined ratio, may be provided in the base station. In such alternative embodiment, the base station controls the transmission power of the multicast signal depending on whether the ratio of the number of the received ARQ signals to the total number of the mobile stations exceeds the predetermined ratio.

Figure 7:
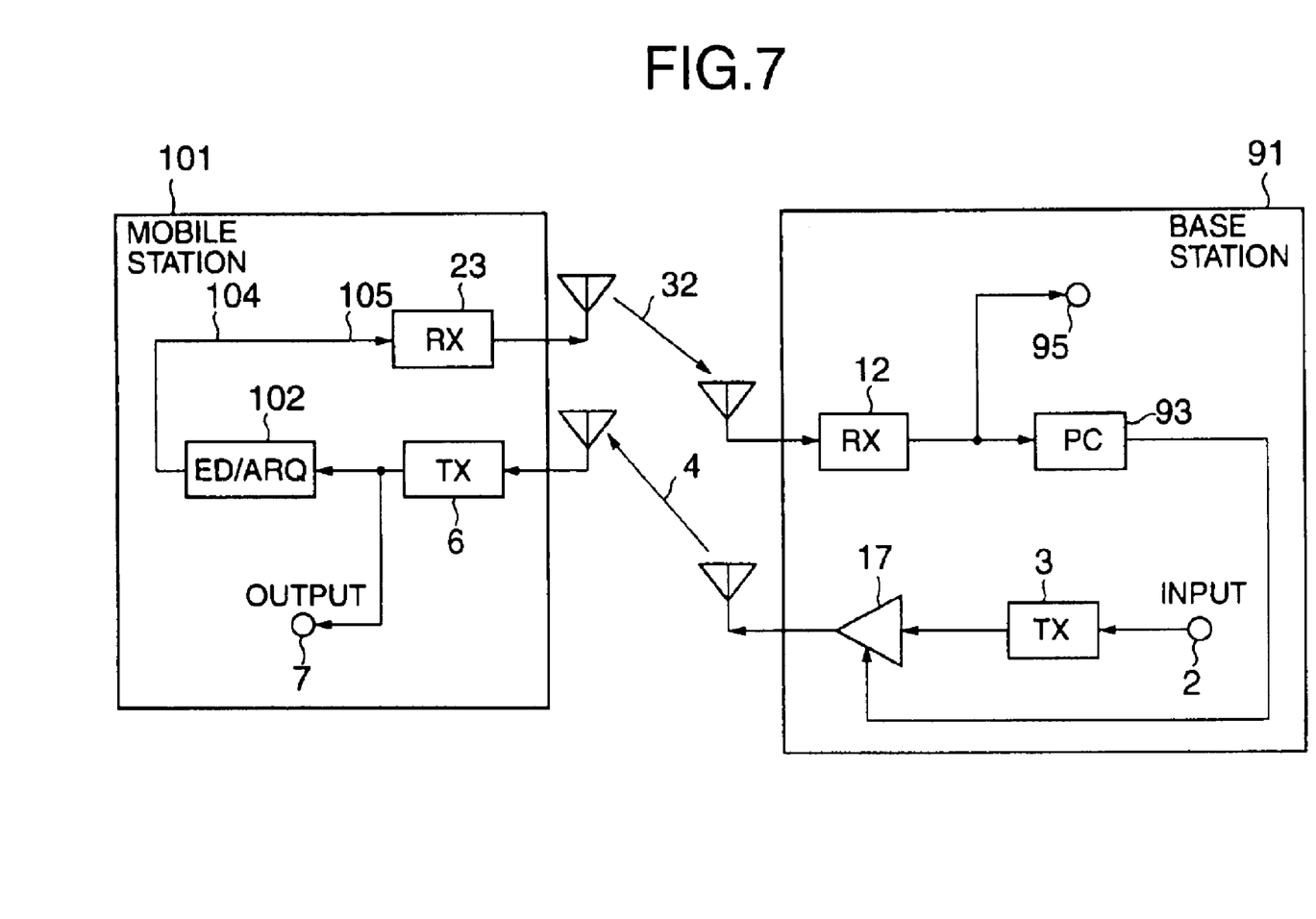
FIG. 7 is a block diagram of a fifth preferred embodiment of the multicast signal transmission system of the invention.

FIG. 7 shows a fifth preferred embodiment of the multicast signal transmission system in which the transmission power control method of the invention is embodied.

In FIG. 7, the elements that are essentially the same as corresponding elements in FIG. I are designated by the same reference numerals, and a description thereof will be omitted.

In the present embodiment, when an error in demodulation of the received multicast signal is detected, each of the mobile stations transmits an ARQ signal to the base station, and the transmission power of the multicast signal of the base station with respect to each mobile station is controlled depending on whether the ratio of the received ARQ signals to the total number of the mobile stations exceeds a predetermined ratio. Further, in the present embodiment, when no error in demodulation of the received multicast signal is detected, each of the mobile stations transmits an acknowledge (ACK) signal to the base station, in order to confirm that the multicast signal from the base station is received at the mobile station without error.

As shown in FIG. 7, in the multicast signal transmission system of the present embodiment, a base station 91 is provided, and the base station 91 transmits the multicast signal 4 to a plurality of mobile stations 101 through the mobile radio link. The plurality of mobile stations 101 are provided in the multicast signal transmission system, and each mobile station 101 receives the multicast signal 4 from the base station 91.

For the sake of simplicity of description, only one mobile station 101 is shown in FIG. 7, and the remaining mobile stations 101, which receive the multicast signal 4 from the base station 91, are omitted.

In the base station 91 shown in FIG. 7, the receiver (RX) 12, an ARQ signal counter unit (PC) 93, the transmitter (TX) 3, and the transmission power controller 17 are provided. The signal counter unit 93 counts the number of ARQ signals received from the mobile stations 101 and the number of ACK signals received from the mobile stations 101. The signal counter unit 93 detects whether the ratio of the number of the received ARQ signals to the total number of the mobile stations 101 (the sum of the number of the received ARQ signals and the number of the received ACK signals) exceeds a predetermined ratio. As described later, the transmission power controller 17 controls the transmission power of the multicast signal 4, sent to each of the mobile stations 101, based on a result of the ARQ ratio detection indicated by an output signal of the signal counter unit 93.

In the base station 91, the original message of the multicast signal 4 is supplied from the input terminal 2, and it is input to the transmitter (TX) 3. In the transmitter 3, the carrier wave is modulated in accordance with the original message from the input terminal 2, so that the multicast signal 4 is produced. In the transmission power controller 17, the transmission power of the multicast signal 4, sent to each of the mobile stations 101, is controlled based on the result of the ARQ ratio detection indicated by the output signal of the signal counter unit 93. After the modulation is performed, the transmitter 3 transmits the multicast signal 4 to each of the mobile stations 101 through the network, based on the controlled transmission power of the transmission power controller 17.

In the mobile station 101, the receiver (RX) 6, an error detection/automatic repeat request (ED/ARQ) unit 102 and the transmitter (TX) 23 are provided. In the present embodiment, the ED/ARQ unit 102 detects whether an error in demodulation of the received multicast signal 4 takes place. The detection of such error in the demodulation of the received multicast signal 4 is performed by the ED/ARQ unit 102 on a block basis with respect to the received multicast signal 4. When an error in the demodulation of a certain block of the received multicast signal is detected, the ED/ARQ unit 102 supplies an ARQ signal 104 (e.g., a negative-acknowledge (NAK) signal), indicating the presence of a demodulation error and a request for retransmission of the error-detected block of the multicast signal to the mobile station 101, to the transmitter 23. When no error in the demodulation of a certain block of the received multicast signal is detected, the ED/ARQ unit 102 supplies an ACK signal 105, indicating the absence of a demodulation error, to the transmitter 23. After the modulation of the ARQ signal 104 or the ACK signal 105 is performed, the transmitter 23 transmits either the ARQ signal 104 or the ACK signal 105, to the base station 91 through the uplink 32 of the radio link.

Similar to the communication system of FIG. 8, in the mobile station 101 shown in FIG. 7, the multicast signal 4 from the base station 91 is received at the receiver (RX) 6. After the demodulation of the received multicast signal is performed, the receiver 6 supplies the demodulated multicast signal to the output terminal 7, and it is supplied from the output terminal 7 to internal units of the mobile station 101.

In the base station 91 of the multicast signal transmission system of FIG. 7, the receiver 12 receives the ARQ signals and the ACK signals from the plurality of mobile stations 101 through the uplink 32 of the radio link. After the demodulation of the received ARQ/ACK signals is performed, the receiver 12 supplies the ARQ/ACK signals of the mobile stations 101 to the signal counter unit 93. At the same time, the ARQ/ACK signals of the mobile stations 101 are supplied from an output terminal 95 into internal units of the base station 91. When the ARQ signal of one of the mobile stations 101 is received, the base station 91 transmits again the error-detected block of the multicast signal to the mobile station 101 (this is not shown in FIG. 7).

In the base station 71 of the present embodiment, the signal counter unit 73 temporarily stores the ARQ signals sent by the receiver 12, and counts the number of the stored ARQ signals at intervals of a predetermined time. At the same time, the signal counter unit 73 temporarily stores the ACK signals sent by the receiver 12, and counts the number of the stored ACK signals at intervals of the predetermined time.

In the base station 91 of the multicast signal transmission system of FIG. 7, the signal counter unit 73 calculates a ratio of the number of the received ARQ signals to the sum of the number of the received ARQ signals and the number of the received ACK signals. The sum of the ARQ-signal number and the ACK-signal number is equal to the total number of the mobile stations 101. Then, when the ratio of the ARQ-signal number to the total number of the mobile stations 101 exceeds the predetermined ratio, the signal counter unit 93 outputs a first power control signal to the transmission power controller 17 so as to increase the current transmission power of the multicast signal 4. On the other hand, when the ratio of the ARQ-signal number to the total number of the mobile stations 101 does not exceed the predetermined ratio, the signal counter unit 93 outputs a second power control signal to the transmission power controller 17 so as to decrease the current transmission power of the multicast signal 4.

In the present embodiment, the amount of the transmission power that is changed (increased or decreased) from the current transmission power to a new transmission power is predetermined.

In the base station 91 of the present embodiment, the transmission power controller 17 controls the transmission power of the multicast signal 4 based on the power control signal sent by the signal counter unit 93. The above-described control procedure is repeatedly performed by the multicast signal transmission system of the present embodiment during the transmission of the multicast signal 4.

In the above-described embodiment, the signal counter unit 73 calculates a ratio of the number of the received ARQ signals to the sum of the number of the received ARQ signals and the number of the received ACK signals. Alternatively, the signal counter unit 73 may calculate a ratio of the number of the received ACK signals to the sum of the number of the received ARQ signals and the number of the received ACK signals. In such alternative embodiment, when the ratio of the ACK-signal number to the total number of the mobile stations 101 exceeds a predetermined ratio, the signal counter unit 93 outputs a first power control signal to the transmission power controller 17 so as to decrease the current transmission power of the multicast signal 4. On the other hand, when the ratio of the ACK-signal number to the total number of the mobile stations 101 does not exceed the predetermined ratio, the signal counter unit 93 outputs a second power control signal to the transmission power controller 17 so as to increase the current transmission power of the multicast signal 4.

The present invention is not limited to the above-described embodiments, and variations and modifications may be made without departing from the scope of the present invention.

Further, the present invention is based on Japanese priority application No. 2000-105231, filed on Apr. 6, 2000, and Japanese priority application No. 2000-105232, filed on Apr. 6, 2000, the entire contents of which are hereby incorporated by reference.

What is claimed is:

1. A method of controlling a transmission power of a multicast signal that is transmitted from a base station to a plurality of mobile stations through a radio link, comprising the steps of:

measuring a value of a received signal quality parameter of a multicast signal received at the mobile stations;

transmitting a parameter signal, indicating the received signal quality parameter value, from the mobile stations to the base station through the radio link;

receiving the parameter signals from the mobile stations at the base station through the radio link;

determining a power control value of each of the mobile stations based on the received signal quality parameter values of the parameter signals received at the base station; and controlling the transmission power of the multicast signal, sent to each of the mobile stations, based on the determined power control value, wherein, in said determining step, the received signal quality parameter values are rearranged into a sequence of the parameter values in a predetermined order, and one of the parameter values in the rearranged sequence that corresponds to a predetermined ratio of the entire mobile stations is determined as being the power control value.

2. The method according to claim 1, wherein a reception power of the received multicast signal is measured as being the value of the received signal quality parameter in said measuring step.

3. The method according to claim 1, wherein, in said measuring step, a carrier-to-cochannel interference C/I ratio of the received multicast signal is measured, and a difference between the measured C/I ratio and a reference C/I ratio is measured as being the value of the received signal quality parameter.

4. The method according to claim 1, wherein one of a bit error ratio, a packet error ratio and a slot error ratio of the received multicast signal is measured as being the value of the received signal quality parameter in said measuring step.

5. The method according to claim 1, wherein one of an error-correction-bit number and a maximum likelihood value, obtained by decoding of the received multicast signal, is measured as being the value of the received signal quality parameter in said measuring step.

6. A base station which controls a transmission power of a multicast signal that is transmitted to a plurality of mobile stations through a radio link, comprising:

a receiver receiving parameter signals from the mobile stations through the radio link, each parameter signal indicating a value of a received signal quality parameter of the multicast signal received at one of the mobile station;

a determination unit determining a power control value of each of the mobile stations based on the received signal quality parameter values of the parameter signals received by the receiver; and a transmission power controller controlling the transmission power of the multicast signal, sent to each of the mobile stations, based on the determined power control value, wherein the determination unit rearranges the received signal quality parameter values into a sequence of the parameter values having a predetermined order, and determines one of the parameter values in the rearranged sequence that corresponds to a predetermined ratio of the entire mobile stations as being the power control value.

7. The base station according to claim 6, wherein each of the mobile stations measures a reception power of the received multicast signal as being the value of the received signal quality parameter.

8. The base station according to claim 6, wherein each of the mobile stations measures a carrier-to-cochannel interference C/I ratio of the received multicast signal, and measures a difference between the measured C/I ratio and a reference C/I ratio as being the value of the received signal quality parameter.

9. The base station according to claim 6, wherein each of the mobile stations measures one of a bit error ratio, a packet error ratio and a slot error ratio of the received multicast signal as being the value of the received signal quality parameter.

10. The base station according to claim 6, wherein each of the mobile stations measures one of an error-correction-bit number and a maximum likelihood value, obtained by decoding of the received multicast signal, as being the value of the received signal quality parameter.

11. A method of controlling a transmission power of a multicast signal that is transmitted from a base station to a plurality of mobile stations through a radio link, comprising the steps of:

transmitting the multicast signal to the mobile stations through the radio link;

receiving an automatic repeat request ARQ signal from each of the mobile stations at the base station through the radio link, wherein each of the mobile stations transmits the ARQ signal to the base station when an error in demodulation of a received multicast signal occurs;

detecting whether at least one of a plurality of ARQ signals from the mobile stations is received at the base station;

outputting a power control signal indicating a result of the ARQ-signal detection; and controlling the transmission power of the multicast signal, sent to each of the mobile stations, based on the ARQ-signal detection result indicated by the power control signal, wherein, in said detecting step, it is detected whether a ratio of the number of the received ARQ signals to the number of the mobile stations exceeds a predetermined ratio, and, in said controlling step, the transmission power of the multicast signal is increased when the ratio of the ARQ-signal number exceeds the predetermined ratio, and the transmission power of the multicast signal is decreased when the ratio of the ARQ-signal number does not exceed the predetermined ratio.

12. The method according to claim 11, wherein, in said controlling step, the transmission power of the multicast signal is increased when at least one of the ARQ signals is received at the base station, and the transmission power of the multicast signal is decreased when none of the ARQ signals is received at the base station.

13. A base station which controls a transmission power of a multicast signal that is transmitted to a plurality of mobile stations through a radio link, comprising:

a transmitter transmitting the multicast signal to the mobile stations through the radio link;

a receiver receiving an automatic repeat request ARQ signal from each of the mobile stations through the radio link, wherein each of the mobile stations transmits the ARQ signal to the base station when an error in demodulation of a received multicast signal occurs;

a signal counter unit detecting whether at least one of a plurality of ARQ signals from the mobile stations is received by the receiver, and outputting a power control signal indicating a result of the ARQ-signal detection; and a transmission power controller controlling the transmission power of the multicast signal, sent to each of the mobile stations, based on the ARQ-signal detection result indicated by the power control signal of the signal counter unit, wherein the signal counter unit is configured to detect whether a ratio of the number of the received ARQ signals to the number of the mobile stations exceeds a predetermined ratio, and wherein the transmission power controller is configured to increase the transmission power of the multicast signal when the ratio of the ARQ-signal number exceeds the predetermined ratio, and to decrease the transmission power of the multicast signal when the ratio of the ARQ-signal number does not exceed the predetermined ratio.

14. The base station according to claim 13, wherein the transmission power controller is configured to increase the transmission power of the multicast signal when at least one of the ARQ signals is received by the receiver, and to decrease the transmission power of the multicast signal when none of the ARQ signals is received by the receiver.

* * * * *